Feb. 4, 1969   J. P. FRYSZTAK   3,426,264
REED SWITCH CONTROLLED INDICATOR FOR
VEHICLE GENERATING SYSTEM
Filed July 7, 1966
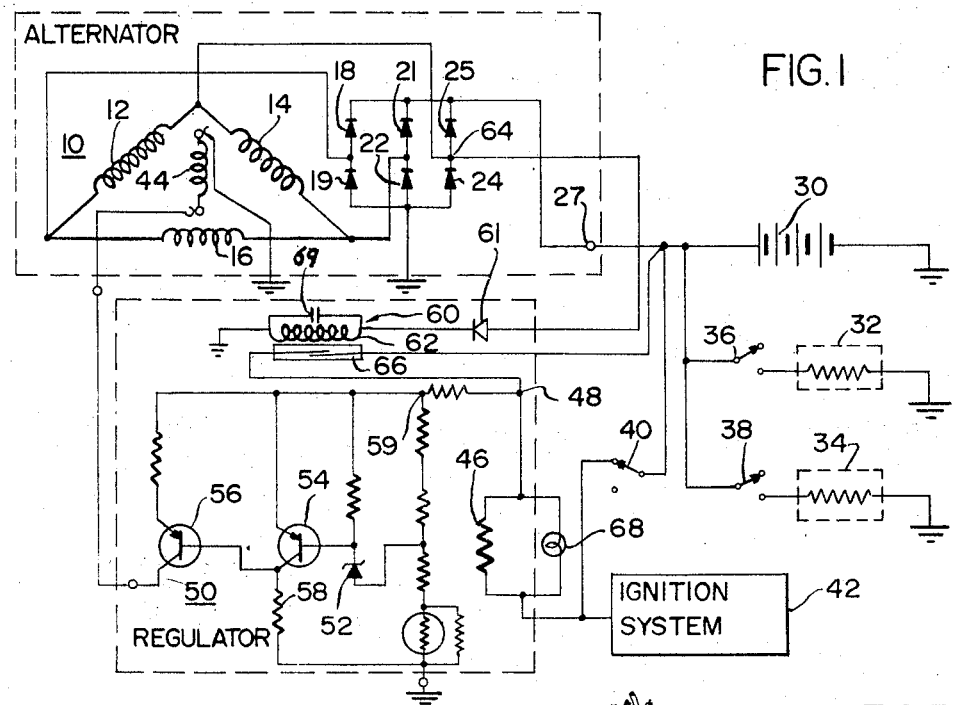
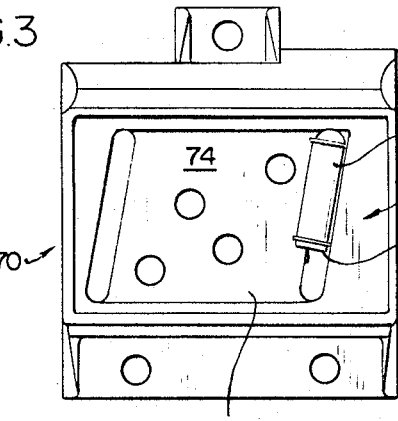
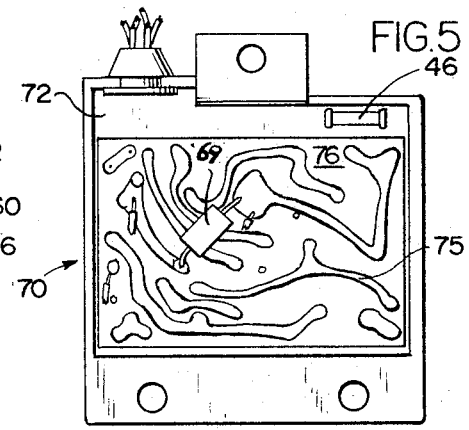
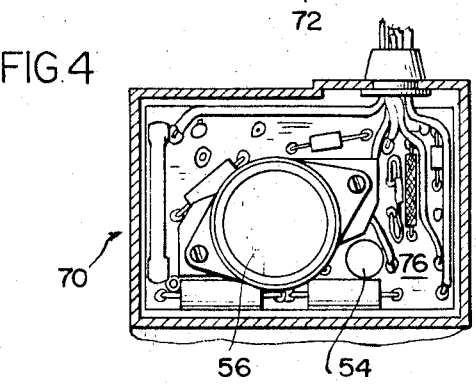
INVENTOR
JEROME P. FRYSZTAK
BY Mueller, Aichele & Raune
ATTORNEYS United States Patent Office 3,426,264
Patented Feb. 4, 1969

3,426,264
REED SWITCH CONTROLLED INDICATOR FOR VEHICLE GENERATING SYSTEM
Jerome P. Frysztak, Glendale Heights, Ill., assignor to Motorola, Inc., Franklin Park, Ill., a corporation of Illinois
Filed July 7, 1966, Ser. No. 563,608
U.S. Cl. 320—48
Int. Cl. H02j 7/04, 7/14
3 Claims

ABSTRACT OF THE DISCLOSURE

A reed switch which is actuated by an output from an alternator connects the battery of a vehicular electrical system to a voltage regulator circuit for providing direct current to energize the field of the alternator to control the output thereof. The reed switch is potted within its actuating coil and mounted within the regulator housing together with the regulator circuit. The regulator housing is filled with an encapsulant which hardens to secure the reed switch and regulator circuit therewithin.

---

This application pertains generally to an electrical generating system for a vehicle, and more particularly to a voltage regulator and indicator light circuit for such a system.

Electrical generating systems for vehicles have been proposed in which the vehicle battery is used directly as the input source for the voltage regulator. In adapting an indicator light for the system to give warning when the system is not generating a sufficient output potential, it has generally been necessary to use a multiple contact relay having one set of contacts for coupling the regulator to the battery and another set controlling the indicator light.

It is an object of this invention to provide an improved electrical generating system for a vehicle.

It is another object of this invention to provide an electrical generating system for a vehicle that can be manufactured relatively inexpensively by using a relay having only a single set of contacts for coupling the voltage regulator to the battery and controlling the indicator light for the system.

In most vehicle generating systems using relays having multiple contacts, the relay is mounted under the hood of the vehicle external of the voltage regulator package so that the relay contacts are exposed to contamination from moisture and other foreign matter. In addition, the voltage regulator circuit within a typical housing is subject to damage by shock and vibration.

It is a further object of this invention to provide a package for the voltage regulator circuit in which the relay and contacts can be housed to prevent contamination thereof and which protects the circuit and elements therein from shock and vibration.

A feature of this invention is an electrical generating system for a vehicle including a source of direct current potential, having a voltage regulator coupled to the potential source for regulating the output therefrom, a relay with a single set of contacts coupled between a storage battery and the voltage regulator, and an indicator light, with a field excitation resistor coupled thereacross, coupled between the battery and the voltage regulator and across the relay so that with the output voltage of the source of direct current potential exceeding the potential of the battery the relay acts to couple the battery to the voltage regulator and shorts out the indicating light and field excitation resistor.

Another feature of this invention is an electrical generating system for a vehicle including a source of direct current potential, having a housing for the voltage regulator in which the relay, field excitation resistor and regulator circuit are mounted, and surrounded by an encapsulant to protect the same against contamination, shock and vibration.

In the drawings:

FIG. 1 is a schematic wiring diagram of a vehicle generating system in accordance with this invention;

FIG. 2 is a side elevation view of a voltage regulator housing in accordance with this invention;

FIG. 3 is a top plan view of the housing in cross-section taken along the lines 3—3 of FIG. 2;

FIG. 4 is a top plan view of the housing taken along the lines 4—4 of FIG. 2; and FIG. 5 is a bottom plan view of the housing when along the lines 5—5 of FIG. 2.

This invention relates to an electrical generating system for a vehicle which includes a full wave rectifier coupled across an alternator to form a direct current potential source. A voltage regulator is connected to the alternator to regulate the output potential in the customary manner. The invention provides a relay with a single set of contacts coupled between the vehicle storage battery and the voltage regulator. An indicator light, with a field excitation resistor coupled thereacross, is coupled between the battery and the voltage regulator and across the relay. The relay coil is connected to one phase of the rectifier and is energized when the output potential of the rectifier exceeds the potential of the battery to close the contacts. Closing the contacts, essentially shorts out the indicator light and field excitation resistor. If a malfunction occurs in the generating system such that the output potential of the alternator drops below battery potential, the contacts will open and the indicator light will come on.

The housing for the voltage regulator not only supports the printed circuit board of the regulator circuit but also the field excitation resistor and relay. An encapsulant such as epoxy surrounds the elements within the housing to protect them from contaminants, shock and vibration.

Referring to the figures of the drawing, in FIG. 1 the alternator 10, which may be driven from the engine of a vehicle in which the electrical generating system is incorporated, includes armature windings 12, 14 and 16 connected in delta. As an alternative, a Y connection could be used. The corners of the delta are connected to the respective interconnections of semiconductor power rectifier pairs 18 and 19, 21 and 22, and 24 and 25. One side of the rectifiers 19, 22 and 24 are connected to a common reference ground potential which may conveniently be the alternator frame, while the other side of the rectifiers 18, 21 and 25 are connected to an output terminal 27 of the alternator. The rectifiers are poled to produce full wave rectification of the three phase output of the alternator. The direct current so produced appears at the output terminal 27 of the alternator 10.

The load for the direct current output alternator 10, connected between output terminal 27 and a reference point, is typically a storage battery 30 and a plurality of electrical accessories on the vehicle, represented by resistors 32 and 34 operably connected to the circuit by switches 36 and 38. These loads could represent such items as a starter, lights, radio and other electrically operated accessories common to vehicles.

An ignition switch 40 includes a movable contact connected to a terminal on battery 40 and a fixed contact connected to the ignition circuit 42 of the type common for internal combustion engines.

Since alternator 10 will turn at various speeds dependent upon the engine speed of the vehicle, it is desirable that the magnetic retentivity in the alternator be virtually zero so that at high speeds the alternator voltage output can be sufficiently reduced by reduction of field current in field winding 44 of the alternator. This means that upon starting, the field current must be externally supplied in order to obtain an initial output. Although it is known to connect the field of the alternator to the battery upon starting, this produces an additional high current drain at a time when maximum current is needed for starting. To limit the initial field current, field excitation resistor 46 is provided between the battery 30 and the input terminal 48 of the voltage regulator 50. Thus, when ignition switch 40 is closed, a small current, in the order of one-fourth ampere, is supplied to the field winding until the alternator is turning at sufficient speed to develop a potential sufficient to supply its own field excitation.

Operation of the voltage regulator 50 is similar to that described in Patent No. 3,185,916 issued to F. C. Brewster and assigned to the assignee of this application, and operates essentially as follows. As the output voltage of the alternator increases, the Zener diode 52 conducts to establish a fixed potential at the base electrode of transistor 54. The emitter voltage of transistor 54 will increase to cause an increased emitter-to-collector conduction. A current gain is experienced, and the voltage established at the base of transistor 56 by increased current through resistor 58 tends to reduce the emitter-collector conduction of transistor 56 and thus reduce the current supplied to the field winding 44. This reduced field current in turn causes a reduction at the output voltage of the alternator so that the voltage at common point 59 of the regulator is low enough to cause diode 52 to cut-off. This results in decreased conduction of the transistor 54, and the base potential established at transistor 56 tends to increase its emitter-collector conduction to supply increased field current, causing the alternator output voltage to rise. Such a cycling of the alternator output voltage above and below the established regulation point of regulator 50 will continue at a faster or slower rate to produce an average current to the field winding which provides the desired regulated output voltage.

Operation of the vehicle generating system can be improved from a regulation standpoint by having the storage battery 30 as the input to the voltage regulator 50. This provides better voltage regulation due to the filter action of the battery which reduces the regulator load slump to a minimum. In addition it sharply reduces line loss effects on battery charge voltage since the regulating source is the battery and not the alternator.

A relay 60 is used to couple the battery 30 to the regulator 50. The relay 60 includes a coil 62 which is coupled to one phase of the full wave rectifier at 64. A diode 61 isolates the coil 62 from the alternator circuitry. The contacts of the relay in this embodiment are formed from a reed switch 66. The reed switch 66 is coupled between the battery 30 and the input 48 of the regulator 50. As was previously described, the field excitation resistor 46 is also coupled between the battery 30 and the input 48 of the regulator. An indicator light 68 is coupled across the field excitation resistor 46, and both the resistor 46 and indicator light 68 are coupled across relay 60.

Operation of the relay is as follows. Upon closing the ignition switch 40 the light 68 comes on to indicate that the alternator 10 is not operating, i.e., the output of the alternator is below the potential of battery 30. The field excitation resistor 46 permits a small amount of current through the regulator to the field 44 until the alternator 10 has a generated output potential that exceeds the potential of battery 30. At this point, a direct current is coupled from one phase of the rectifier at point 64 to the coil 62 of the relay 60. With the coil 62 energized, the reed switch 66 is closed. Closing of the reed switch 66 effectively shorts out the indicator light 68 and resistor 46, and connects the battery 30 to the input 48 of the regulator 50. At low speeds it was found that a ripple of DC current opened and shut reed switch 66. To eliminate this, a capacitor 70 is coupled across the coil 62. The capacitor 70 eliminates the ripple and insures that the reed switch 66 remains closed.

Should some malfunction in the system cause the output of the regulator 10 to drop below the potential of battery 30, the reed switch 66 will open thereby connecting the battery to the regulator 50 through the field excitation resistor 46 and the light 68. The light, therefore, will come on indicating the malfunction.

FIGS. 2 through 5 show the regulator housing 70 which was developed to protect the relay 60 and contacts from contamination, and all of the elements of the regulator circuit from vibration and shock.

A base plate 72 divides the housing into two compartments. Mounted in the top compartment 74 is the reed switch 66 which is potted inside the coil 62. In the compartment beneath the plate 72, is a printed circuit board 76 on which are mounted the principal elements in the voltage regulator 50 circuit which include the transistors 56 and 54. Mounted on the underside of the printed circuit board 76 as shown in FIG. 5 besides the conductive strips 75 is the capacitor 70, which is across coil 62, and mounted to the underside of the base plate 72 is field excitation resistor 46.

After the relay 60 is mounted in the top compartment 74 of the housing, and the printed circuit board and resistor 46 are mounted to the plate 72 in the bottom portion of the housing, an encapsulant such as epoxy is poured into the housing and hardened. The result of this is that all of the components are rigidly held within the housing and protected against contamination such as moisture or dirt and against shock and vibration which is often encountered in vehicles.

What has been described, therefore, is an improved electrical generating system for a vehicle that can be manufactured relatively inexpensively by using a relay having a single set of contacts to couple the voltage regulator to the battery and to control the system indicator light, and which uses a unique housing for the voltage regulator that includes mounting for the relay and contacts to prevent contamination thereof and which protects the elements of the regulator circuit from shock and vibration.

I claim:

1. In an electrical system for a vehicle having generator means for generating a direct current potential including a field winding for varying the direct current output from the generator means, the combination including a storage battery connected to the output of and coupled across the generator means, a voltage regulator for regulating the output voltage of the generator means having an input, and an output which is connected to the field winding of the generator means, a reed switch connected to the input of said voltage regulator and coupled across said battery and the generator means, an actuating coil for said reed switch connected to the generator means, and indicating means for indicating insufficient output from the generator means, said indicating means connected between said battery and the input of said regulator and across said reed switch, said actuating coil being energized by an output voltage from the generator means to actuate said reed switch which couples a potential from said battery to said voltage regulator thereby supplying direct current to the field winding of the generator means and shorting said indicating means.

2. The electrical system of claim 1 wherein the generator means is a three phase alternator, and said actuating coil is connected across one phase of the alternator.

3. The electrical system of claim 1 wherein said voltage regulator is mounted in a regulator housing, said reed switch is potted in said actuating coil, and said reed switch and actuating coil and said voltage regulator are mounted within said regulator housing with an encapsulant to protect the same against shock and contaminants.

(References on following page)

References Cited

UNITED STATES PATENTS

| | | | | |
|---|---|---|---|---|
| 2,903,536 | 9/1959 | McBrian | 335—154 |
| 3,107,323 | 10/1963 | Plante | 320—48 |
| 3,114,807 | 12/1963 | Koda | 335—154 X |
| 3,363,167 | 1/1968 | Szabo et al. | 322—28 X |
| 3,364,567 | 1/1968 | Brown et al. | 174—68.5 X |
| 2,908,854 | 10/1959 | Rice | 320—48 |
| 3,185,916 | 5/1965 | Brewster | 322—73 |
| 3,293,536 | 12/1966 | Byles | 320—64 |

JOHN F. COUCH, *Primary Examiner.*

S. WEINBERG, *Assistant Examiner.*

U.S. Cl. X.R.

320—61